United States Patent
Ren et al.

(10) Patent No.: US 12,092,857 B2
(45) Date of Patent: Sep. 17, 2024

(54) DISPLAY MODULE, MANUFACTURING METHOD THEREOF, AND MOBILE TERMINAL

(71) Applicant: WUHAN CHINA STAR OPTOELECTRONICS TECHNOLOGY CO., LTD., Wuhan (CN)

(72) Inventors: Yuanyuan Ren, Wuhan (CN); Zhuo Zhang, Wuhan (CN)

(*) Notice: Subject to any disclaimer, the term of this patent is extended or adjusted under 35 U.S.C. 154(b) by 0 days.

(21) Appl. No.: 17/762,062

(22) PCT Filed: Mar. 15, 2022

(86) PCT No.: PCT/CN2022/080883
§ 371 (c)(1),
(2) Date: Aug. 31, 2023

(87) PCT Pub. No.: WO2023/159693
PCT Pub. Date: Aug. 31, 2023

(65) Prior Publication Data
US 2024/0111086 A1    Apr. 4, 2024

(30) Foreign Application Priority Data
Feb. 25, 2022   (CN) .......................... 202210175690.9

(51) Int. Cl.
*F21V 8/00* (2006.01)
(52) U.S. Cl.
CPC ......... *G02B 6/0076* (2013.01); *G02B 6/0055* (2013.01)
(58) Field of Classification Search
CPC .................................................. G02B 6/0076
See application file for complete search history.

(56) References Cited

U.S. PATENT DOCUMENTS

| | | |
|---|---|---|
| 2007/0013828 A1 | 1/2007 | Cho et al. |
| 2011/0102707 A1 | 5/2011 | Yoo |
| 2020/0292870 A1 | 9/2020 | Kawano |

FOREIGN PATENT DOCUMENTS

| | | |
|---|---|---|
| CN | 101915396 A | 12/2010 |
| CN | 106813164 A | 6/2017 |
| CN | 110687720 A | 1/2020 |
| CN | 110703496 A | 1/2020 |
| CN | 111176018 A | 5/2020 |
| CN | 113296306 A | 8/2021 |

OTHER PUBLICATIONS

International Search Report in International application No. PCT/CN2022/080883, mailed on Nov. 28, 2022.
Written Opinion of the International Search Authority in International application No. PCT/CN2022/080883, mailed on Nov. 28, 2022.
Chinese Office Action issued in corresponding Chinese Patent Application No. 202210175690.9 dated Dec. 8, 2022, pp. 1-5.

*Primary Examiner* — Robert J May

(57) ABSTRACT

A display module, a manufacturing method thereof, and a mobile terminal are disclosed. The display module has a functional display area and a main display area and includes a display panel and a backlight module. The backlight module includes a first backlight unit corresponding to the functional display area, and the first backlight unit includes a first section, a second section disposed around the first section, and a spacer disposed between the first section and the second section. The first section and the second section are integrally formed and on different layers.

20 Claims, 10 Drawing Sheets

DISPLAY MODULE, MANUFACTURING METHOD THEREOF, AND MOBILE TERMINAL

FIELD OF INVENTION

The present disclosure relates to the field of display technologies, and more particularly, to a display module, a manufacturing method thereof, and a mobile terminal.

BACKGROUND OF INVENTION

Referring to FIG. 1, in recent years, a backlight module of a conventional display module 1000 provides light sources for the conventional display module 1000 and is an important component of the conventional display module 1000. For under-screen display, the conventional display module 1000 includes a functional display area B and a main display area A surrounding the functional display area B. The conventional display module 1000 includes a conventional display panel 2000, a conventional main backlight 3000, and a conventional sub backlight. The conventional sub backlight corresponds to the functional display area B and consists of two layers of backlight, thereby realizing time-sharing control and fill light effect. The conventional sub backlight includes a first conventional backlight 5100 and a second conventional backlight 5200. The first conventional backlight 5100 includes a first conventional light strip 5110, and the second conventional backlight 5200 includes a second conventional light strip 5210. The first conventional backlight 5100 and the second conventional backlight 5200 are not on a same layer, so two independent light strips are required, and two independent connectors 4000 are also required. Therefore, a structure thereof is complicated, a manufacturing process is complicated, and a cost thereof is high.

Therefore, it is necessary to provide a display module, a manufacturing method thereof, and a mobile terminal to solve the above technical problem.

Technical problem: the present disclosure provides a display module, a manufacturing method thereof, and a mobile terminal to solve the technical problem of a complicated manufacturing process and a high cost of two layers of backlight in current first backlight unit.

SUMMARY OF INVENTION

To solve the above problems, the embodiments of the present disclosure provide technical solutions as follows.

An embodiment of the present disclosure provides a display module, which has a functional display area and a main display area surrounding the functional display area and includes:
a display panel; and
a backlight module disposed on one side of the display panel and including a first backlight unit corresponding to the functional display area, wherein, the first backlight unit includes a first section and a second section disposed around the first section, and the first section and the second section are integrally formed;
wherein, the first section and the second section are disposed on different layers, and the first backlight unit further includes a spacer disposed between the first section and the second section.

Preferably, the first backlight unit further includes a connecting section and a third section; and the first section and the second section are converged to the connecting section to be integrally formed, and the connecting section extends toward the third section.

Preferably, in a top view direction of the backlight module, the spacer is disposed on both sides and away from the connecting section, and the spacer and the second section have an overlapping area.

Preferably, the first section includes a first light bar part, a first reflective sheet on one side away from the display panel, and a first light guide plate disposed on one side of the first reflective sheet adjacent to the display panel; the second section includes a second light bar part, a second reflective sheet on the side away from the display panel, a second light guide plate disposed on one side of the second reflective sheet adjacent to the display panel, and a brightness enhancement film disposed on one side of the second light guide plate adjacent to the display panel; and the first light bar part includes a first light board and a plurality of first light-emitting units disposed on a periphery of the first light board, the second light bar part includes a second light board and a plurality of second light-emitting units disposed on a periphery of the second light board, the second reflective sheet corresponding to the spacer is in contact with the second light board, and the second reflective sheet not corresponding to the spacer is suspended on the second light board.

Preferably, the first backlight unit further includes a bus section, the first section includes a first wire section, and the second section includes a second wire section; and the first wire section and the second wire section are converged to the bus section, and the bus section is on a same layer as the first wire section or the second wire section.

Preferably, the backlight module further includes a second backlight unit corresponding to the main display area, and the second section is disposed between the first section and the second backlight unit.

Preferably, a part of the second section overlaps the second backlight unit.

Preferably, in a direction from a light-emitting side of the second section through one side away from the light-emitting side of the second section to the first section, an included angle between a plane where the first section is located and a plane where the second section is located is an acute angle.

Preferably, the display module further includes an optical module, the first section includes a first opening, and the optical module is disposed corresponding to the first opening.

Preferably, a transparent layer is filled between the first backlight unit and the display panel.

An embodiment of the present disclosure further provides a manufacturing method of a display module. The method includes following steps:
forming a spacer on a backplate;
providing a first backlight component including a first light bar part and a second light bar part that are integrally formed, wherein, the second light bar part is disposed around the first light bar part; and
attaching the first backlight component to the backplate, disposing the first light bar part and the second light bar part on different layers by the spacer to form a first section and a second section on different layers, and forming a first backlight unit.

An embodiment of the present disclosure further provides a mobile terminal, which includes a display module and a terminal body, wherein, the terminal body and the display module are combined into one integrated structure;

the display module has a functional display area and a main display area surrounding the functional display area and includes:
a display panel;
a backlight module disposed on one side of the display panel and including a first backlight unit corresponding to the functional display area, wherein, the first backlight unit includes a first section and a second section disposed around the first section, and the first section and the second section are integrally formed;
wherein, the first section and the second section are disposed on different layers, and the first backlight unit further includes a spacer disposed between the first section and the second section.

Preferably, the first backlight unit further includes a connecting section and a third section; and the first section and the second section are converged to the connecting section to be integrally formed, and the connecting section extends toward the third section.

Preferably, in a top view direction of the backlight module, the spacer is disposed on both sides and away from the connecting section, and the spacer and the second section have an overlapping area.

Preferably, the first section includes a first light bar part, a first reflective sheet on one side away from the display panel, and a first light guide plate disposed on one side of the first reflective sheet adjacent to the display panel; the second section includes a second light bar part, a second reflective sheet on the side away from the display panel, a second light guide plate disposed on one side of the second reflective sheet adjacent to the display panel, and a brightness enhancement film disposed on one side of the second light guide plate adjacent to the display panel; and the first light bar part includes a first light board and a plurality of first light-emitting units disposed on a periphery of the first light board, the second light bar part includes a second light board and a plurality of second light-emitting units disposed on a periphery of the second light board, the second reflective sheet corresponding to the spacer is in contact with the second light board, and the second reflective sheet not corresponding to the spacer is suspended on the second light board.

Preferably, the first backlight unit further includes a bus section, the first section includes a first wire section, and the second section includes a second wire section; and the first wire section and the second wire section are converged to the bus section, and the bus section is on a same layer as the first wire section or the second wire section.

Preferably, the backlight module further includes a second backlight unit corresponding to the main display area, and the second section is disposed between the first section and the second backlight unit.

Preferably, a part of the second section overlaps the second backlight unit.

Preferably, in a direction from a light-emitting side of the second section through one side away from the light-emitting side of the second section to the first section, an included angle between a plane where the first section is located and a plane where the second section is located is an acute angle.

Preferably, the display module further includes an optical module, the first section includes a first opening, and the optical module is disposed corresponding to the first opening.

Beneficial effect: the embodiments of the present disclosure have the first section and the second section that are integrally formed be on different layers by the spacer when bonding, thereby realizing time-sharing control and fill light effect. Therefore, a difficulty of a manufacturing process can be reduced, a cost can be reduced, and overall display effect can be improved.

DETAILED DESCRIPTION OF PREFERRED EMBODIMENTS

Figure 1:
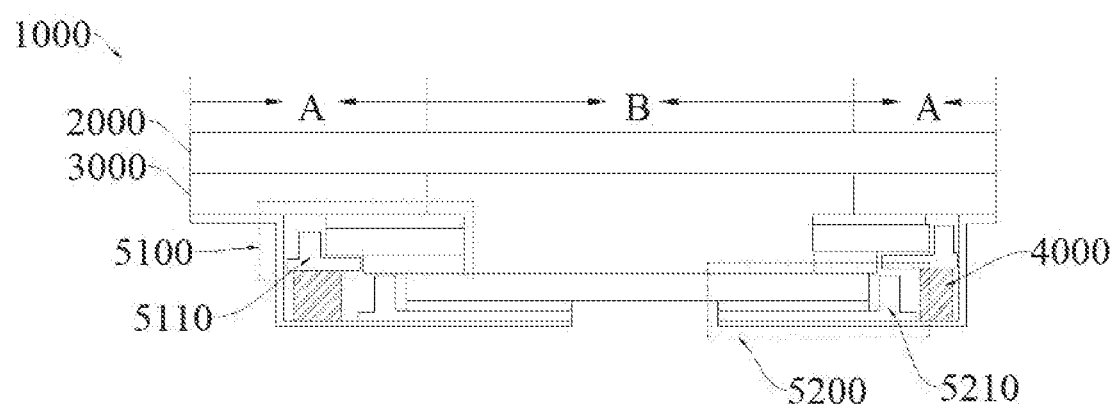
FIG. 1 is a schematic structural diagram of a display module in current technology.

The present disclosure provides a display module, a manufacturing method thereof, and a mobile terminal. In order to make the purpose, technical solutions, and effects of this disclosure clearer and more definite, the following further describes this disclosure in detail with reference to the drawings and embodiments. It should be understood that the specific embodiments described herein are only used to explain the disclosure, and are not used to limit the disclosure.

An embodiment of the present disclosure provides a display module, a manufacturing method thereof, and a mobile terminal. They will be described in detail in the following. It should be noted that an order of description in the following embodiments is not meant to limit a preferred order of the embodiments.

Referring to FIGS. 2 to 9, an embodiment of the present disclosure provides a display module 100, which has a functional display area B and a main display area A surrounding the functional display area B. The display module 100 includes:
a display panel 200; and
a backlight module 300 disposed on one side of the display panel 200 and including a first backlight unit 400 corresponding to the functional display area B, wherein, the first backlight unit 400 includes a first section 410 and a second section 420 disposed around the first section 410, and the first section 410 and the second section 420 are integrally formed.

Wherein, the first section 410 and the second section 420 are disposed on different layers, and the first backlight unit 400 further includes a spacer 440 disposed between the first section 410 and the second section 420.

The embodiment of the present disclosure has the first section and the second section that are integrally formed be on different layers by the spacer when bonding, thereby realizing time-sharing control and fill light effect. Therefore, a difficulty of a manufacturing process can be reduced, a cost can be reduced, and overall display effect can be improved.

Specific embodiments are used to describe technical solutions of the present disclosure.

Figure 2:
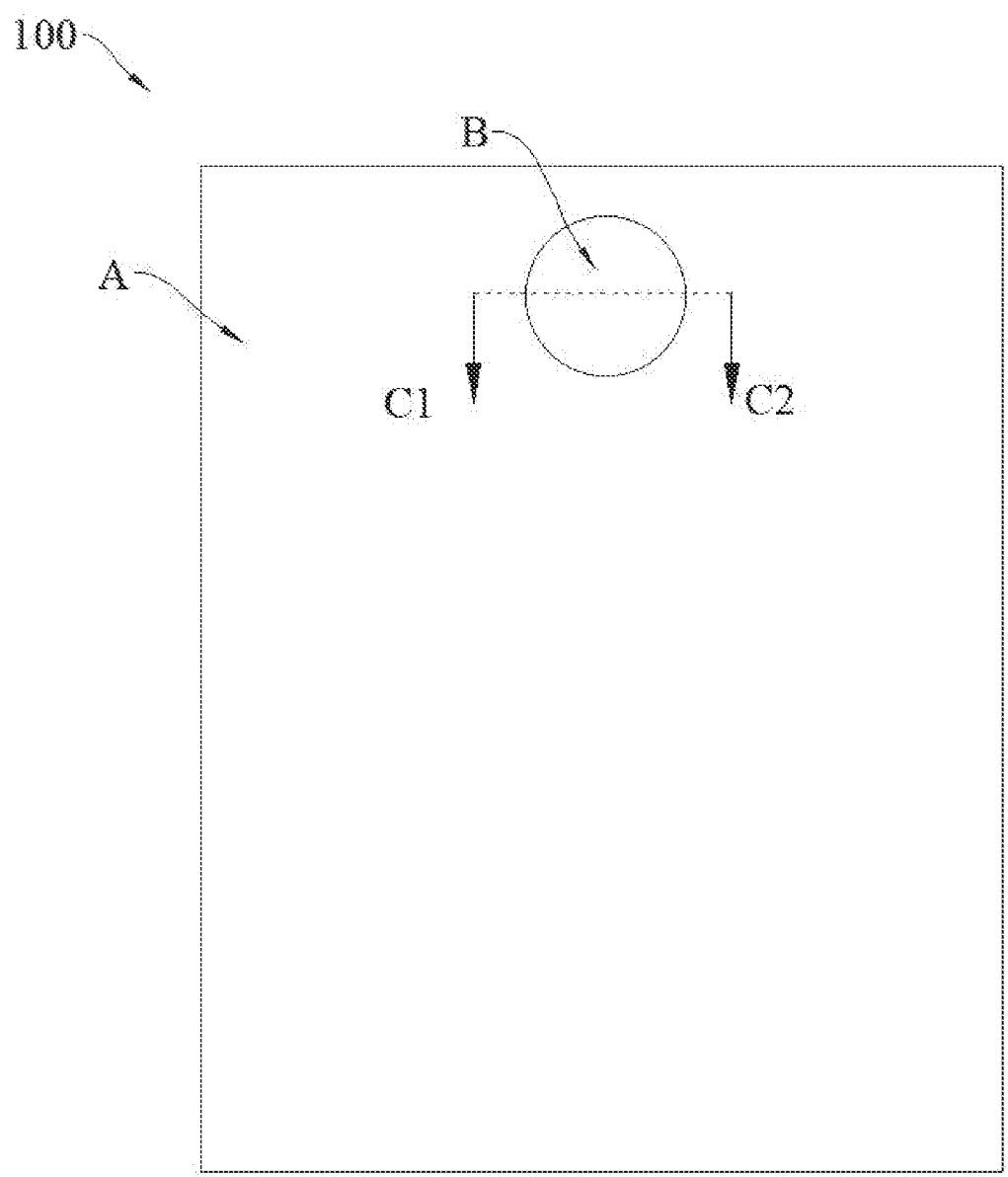
FIG. 2 is a schematic top view of a first structure of a display module according to an embodiment of the present disclosure.
Figure 3:
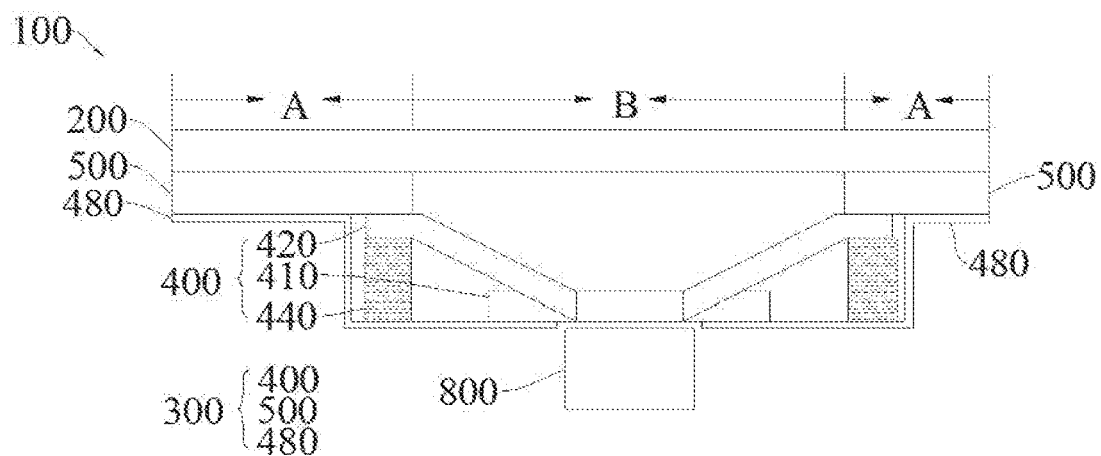
FIG. 3 is a schematic structural diagram of the display module along a cross-section C1C2 in FIG. 2.

In this embodiment, referring to FIGS. 2 and 3, the display module 100 includes the functional display area B and the main display area A surrounding the functional display area B. The display module 100 includes the display panel 200 and the backlight module 300 disposed on one side of the display panel 200.

In some embodiments, referring to FIG. 3, the backlight module 300 includes the first backlight unit 400 corresponding to the functional display area B. The first backlight unit 400 includes the first section 410 and the second section 420 disposed around the first section 410, and the first section 410 and the second section 420 are integrally formed. Wherein, the first section 410 and the second section 420 are disposed on different layers, and the first backlight unit 400 further includes the spacer 440 disposed between the first section 410 and the second section 420.

Figure 9:
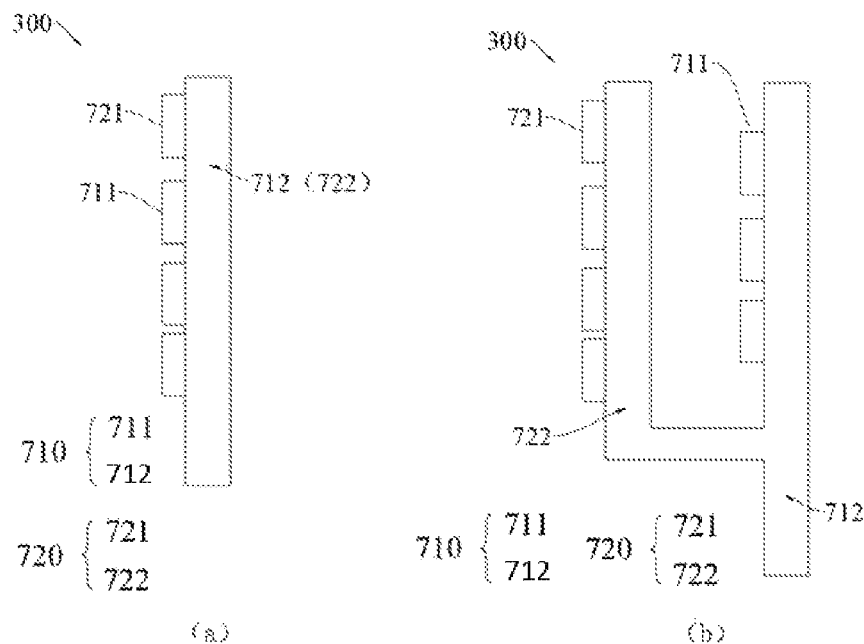
FIG. 9 is a schematic structural diagram of the display module in a direction E of FIG. 7.

If two independent light strips are used, an overlapping area in a middle of the two light strips will be wasted. Referring to FIG. 9, FIG. 9 is a schematic view in a direction E of FIG. 7. In FIG. 9, a first light bar part 710 is used to represent the first section 410, and a second light bar part 720 is used to represent the second section 420. With the spacer 440, the first section 410 and the second section 420 that are integrally formed can be disposed on different layers at the spacer 440 when bonding, thereby forming a structure having a higher position and a lower position. FIG. 9(a) is the structure before elevating, and FIG. 9(b) is the structure after elevating. Therefore, the time-sharing control and fill light effect can be realized, and a backlight structure of an under-screen functional display area B can be simplified, thereby realizing thinning of the backlight structure of the functional display area B, simplifying the assembly, reducing the difficulty of the manufacturing process, reducing the cost, and improving overall display effect.

Figure 4:
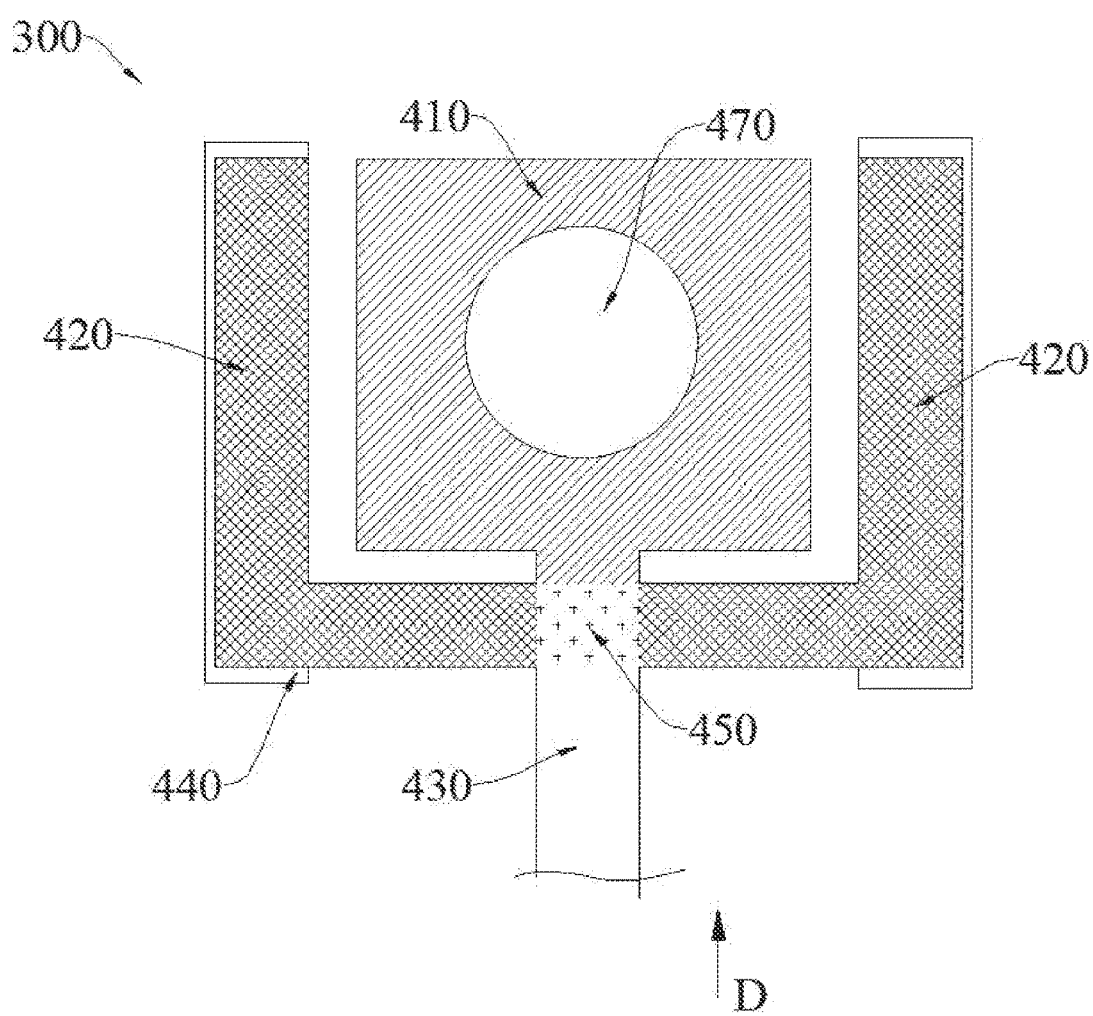
FIG. 4 is a partial schematic top view of a second structure of the display module according to an embodiment of the present disclosure.

In some embodiments, referring to FIG. 4, the first backlight unit 400 further includes a connecting section 450 and a third section 430. The first section 410 and the second section 420 are converged to the connecting section 450 to be integrally formed, and the connecting section 450 extends toward the third section 430.

With the connecting section 450, the first section 410 and the second section 420 can be connected together and integrally formed. When manufacturing the first backlight unit 400, the first section 410 and the second section 420 have been formed integrally with the connecting section 450. The first section 410 and the second section 420 are both flexible materials, such as printed circuit boards, and the first section 410 and the second section 420 can be disposed on different layers by using the raised spacer 440 to elevate the second section 420 when bonding.

In some embodiments, referring to FIG. 4, in a top view direction of the backlight module 300, the spacer 440 is disposed on both sides and away from the connecting section 450, and the spacer 440 and the second section 420 have an overlapping area.

The spacer 440 being positioned on both sides and away from the connecting section 450 is beneficial for the second section 420 being elevated and disposed on a different layer from the first section 410 to form the structure having the higher position and the lower position, thereby realizing time-sharing control and fill light effect.

Figure 5:
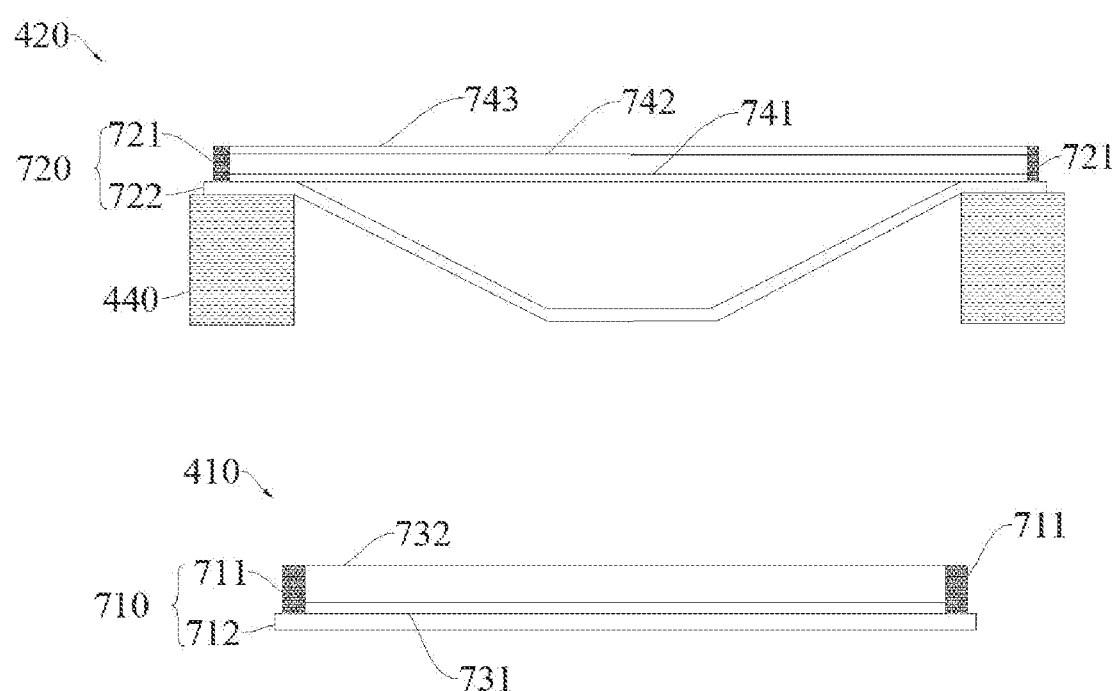
FIG. 5 is a schematic structural diagram of the display module in a direction D of FIG. 4.
Figure 7:
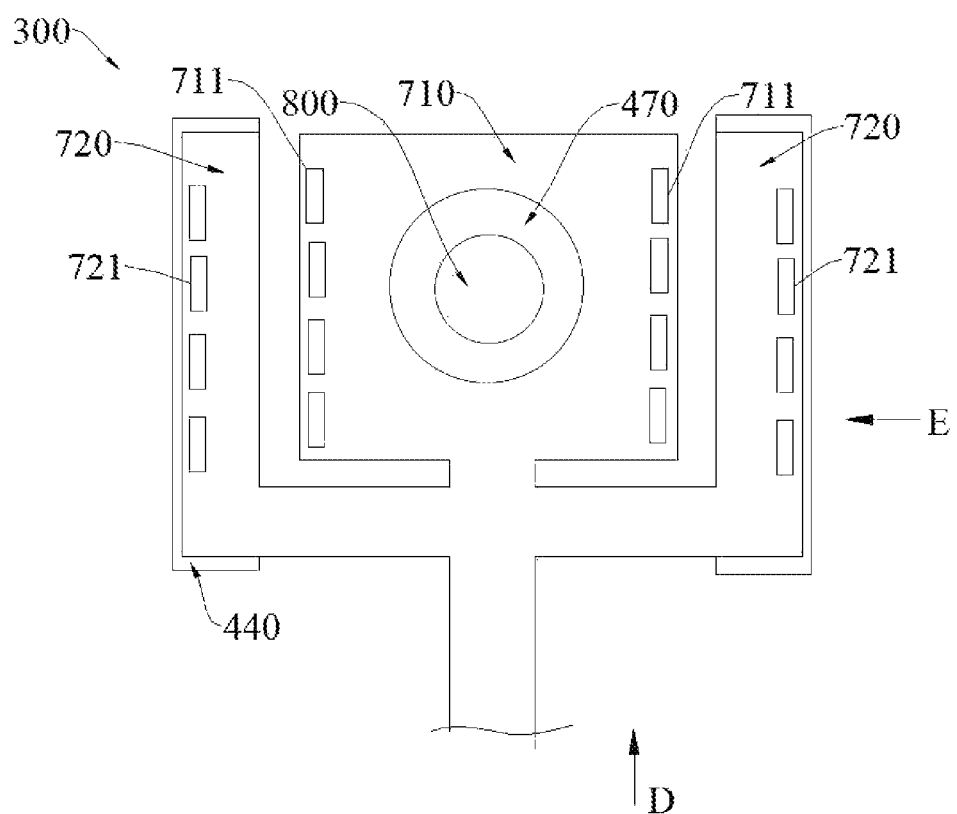
FIG. 7 is a partial schematic top view of a fourth structure of the display module according to an embodiment of the present disclosure.

In some embodiments, referring to FIGS. 5 and 7, the first section 410 includes the first light bar part 710, and the second section 420 includes the second light bar part 720. The first light bar part 710 includes a first light board 712 and a plurality of first light-emitting units 711 disposed on a periphery of the first light board 712. The second light bar part 720 includes a second light board 722 and a plurality of second light-emitting units 721 disposed on a periphery of the second light board 722.

In some embodiments, referring to FIG. 5, FIG. 5 is a schematic view of FIG. 4 in a direction D. For the convenience of understanding, the first section 410 and the second section 420 are drawn separately. The first section 410 includes the first light bar part 710, a first reflective sheet 731 on one side away from the display panel 200, and a first light guide plate 732 disposed on one side of the first reflective sheet 731 adjacent to the display panel 200. The second section 420 includes the second light bar part 720, a second reflective sheet 741 on the side away from the display panel 200, a second light guide plate 742 disposed on one side of the second reflective sheet 741 adjacent to the display panel 200, and a brightness enhancement film 743 disposed on one side of the second light guide plate 742 adjacent to the display panel 200. The backlight module 300 further includes a backplate 480 located on one side of the first reflective sheet 731, the second reflective sheet 741, and the spacer 440 away from the display panel 200.

In some embodiments, referring to FIG. 5, parts of the second reflective sheet 741, the second light guide plate 742, and the brightness enhancement film 743 corresponding to the spacer 440 are in contact with the second light board 722. Parts of the second reflective sheet 741, the second light guide plate 742, and the brightness enhancement film 743 not corresponding to the spacer 440 are suspended on the second light board 722.

Figure 6:
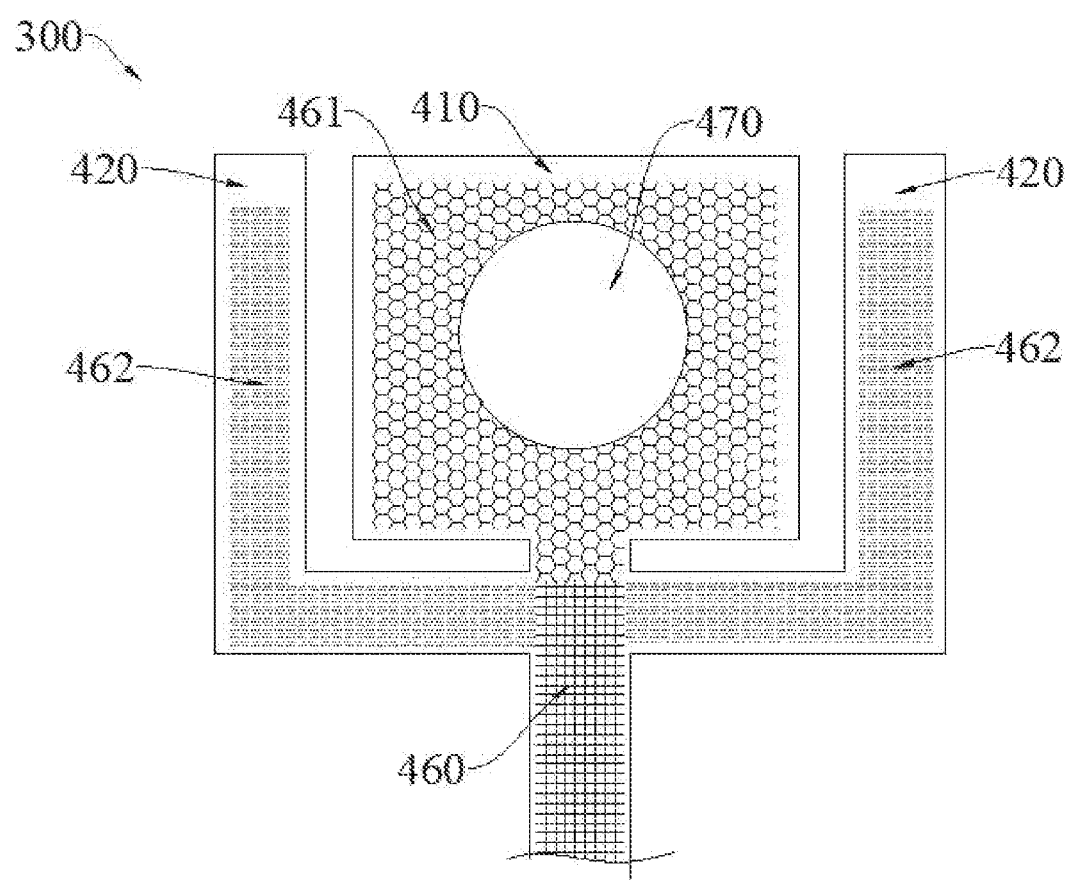
FIG. 6 is a partial schematic top view of a third structure of the display module according to an embodiment of the present disclosure.

In some embodiments, referring to FIG. 6, the first backlight unit 400 further includes a bus section 460, the first section 410 includes a first wire section 461, and the second section 420 includes a second wire section 462. The first wire section 461 and the second wire section 462 are converged to the bus section 460, and the bus section 460 is on a same layer as the first wire section 461 or the second wire section 462.

The first section 410 and the second section 420 emit light independently, and wires of the two can be gathered together after their respective parts are routed, which can save a wiring space and facilitate connections with a controller.

In some embodiments, lines of the first wire section 461 may be disposed in the first light board 712 of the first light bar part 710, lines of the second wire section 462 may be disposed in the second light board 722 of the second light bar part 720. The lines of the first wire section 461 are electrically connected to the first light-emitting units 711, and the lines of the second wire section 462 are electrically connected to the second light-emitting units 721.

In some embodiments, referring to FIG. 2, the backlight module 300 further includes a second backlight unit 500 corresponding to the main display area A, and the second section 420 is disposed between the first section 410 and the second backlight unit 500.

The second section 420, that is, a peripheral light-emitting part is closer to the second backlight unit 500, is adjacent to an edge of the functional display area B, which is beneficial to reduce a brightness difference between the main display area A and the functional display area B, thereby realizing time-sharing control and fill light effect.

In some embodiments, referring to FIG. 2, a part of the second section 420 overlaps the second backlight unit 500. The second section 420 overlapping the second backlight unit 500 can ensure connection stability and light sealing between the first backlight unit 400 and the second backlight unit 500, thereby preventing light leakage and improving the display effect of the main display area A and the functional display area B.

In some embodiments, the backlight module 300 further includes a light-shielding unit disposed between the second section 420 and the second backlight unit 500. The light-shielding unit can reduce an influence of light between the second section 420 and the second backlight unit 500, thereby improving the display effect of the main display area A and the functional display area B.

Figure 8:
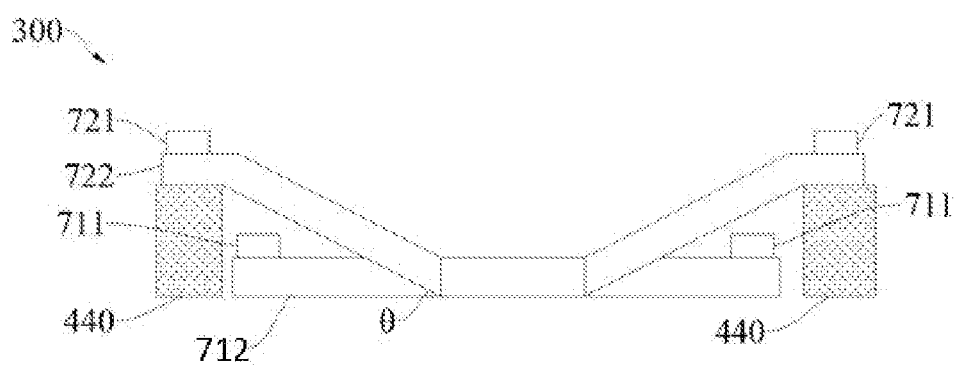
FIG. 8 is a schematic structural diagram of the display module in a direction D of FIG. 7.

In some embodiments, referring to FIG. 8, in a direction from a light-emitting side of the second section 420 through one side away from the light-emitting side of the second section 420 to the first section 410, an included angle θ between a plane where the first section 410 is located and a plane where the second section 420 is located is an acute angle.

FIG. 8 is a schematic view in a direction D of FIG. 7. In FIG. 8, the first light bar part 710 is used to represent the first section 410, and the second light bar part 720 is used to represent the second section 420. By adjusting a disposed position of the spacer 440, the second section 420 can be tilted to different angles, thereby realizing a setting height of the second section 420. A specific angle can be set according to an area of the functional display area B or process requirements. For example, in the direction from the light-emitting side of the second section 420 through the side away from the light-emitting side of the second section 420 to the first section 410, the included angle θ ranges from 15° to 45°, so that it can ensure the second section 420 has a sufficient height, and light emitted by the second section 420 can also be emitted in a direction nearly perpendicular to the display panel 200. Therefore, the time-sharing control and fill light effect of the functional display area B can be ensured, and the backlight structure of the under-screen functional display area B can be simplified, thereby realizing thinning of the backlight structure of the functional display area B, simplifying the assembly, reducing the difficulty of the manufacturing process, reducing the cost, and improving overall display effect.

In some embodiments, a material of the spacer 440 is silicone or resin. Therefore, using flexibility of silicone or resin materials can have a good buffering effect on the second section 420 while realizing the elevated effect, thereby protecting the first backlight unit 400 and extending a service life of the first backlight unit 400.

In some embodiments, the spacer 440 includes a telescopic unit, and a telescopic direction of the telescopic unit is perpendicular to the display panel 200.

The spacer 440 may have a changeable thickness, thereby adjusting an elevated distance between the first section 410 and the second section 420 or adjusting the included angle θ of the second section 420. Therefore, various scenarios of different process parameters or different optical requirements can be adapted, thereby improving adjustability and convenience of adjustment.

In some embodiments, referring to FIGS. 3 and 7, the display module 100 further includes an optical module 800, the first section 410 includes a first opening 470, and the optical module 800 is disposed corresponding to the first opening 470.

The optical module 800 may also be located in the first opening 470. When the optical module 800 is working, the functional display area B is not displayed. When the optical module 800 is not working, the functional display area B is displayed, thereby achieving true full-screen display. The first opening 470 can improve a light-collecting efficiency of the optical module 800.

In some embodiments, the optical module 800 may be any one of a camera, an optical fingerprint sensor, an infrared sensor, or a distance sensor.

In some embodiments, a transparent layer is filled between the first backlight unit 400 and the display panel 200. A material of the transparent layer is a transparent material. The optical module 800 being a camera is taken as an example, an outer ring of the transparent material has no main backlight film material, so light is weak here and needs to be supplemented. The first section 410 can make the brightness here more uniform when not taking pictures. The second light guide plate 742 may realize a transparent state and a non-transparent state by a switch. When taking pictures, light emitted from the second section 420 is turned off and the transparent state of the second light guide plate 742 is turned on, so the camera can have more light to pass through, and pictures can be taken more clearly.

In some embodiments, the display panel 200 includes an array substrate disposed on the backlight module 300, a liquid crystal layer disposed on the array substrate, a color filter layer disposed on the liquid crystal layer, and polarizing layers disposed on upper and lower sides of the liquid crystal layer.

In some embodiments, the array substrate includes an active layer disposed on a substrate, a first insulating layer disposed on the active layer, a gate electrode layer disposed on the first insulating layer, a second insulating layer disposed on the gate electrode layer, a source and drain electrode layer disposed on the second insulating layer, and a third insulating layer disposed on the source and drain electrode layer.

The embodiment of the present disclosure has the first section and the second section that are integrally formed be on different layers by the spacer when bonding, thereby realizing time-sharing control and fill light effect. Therefore, the difficulty of the manufacturing process can be reduced, the cost can be reduced, and overall display effect can be improved.

Figure 10:
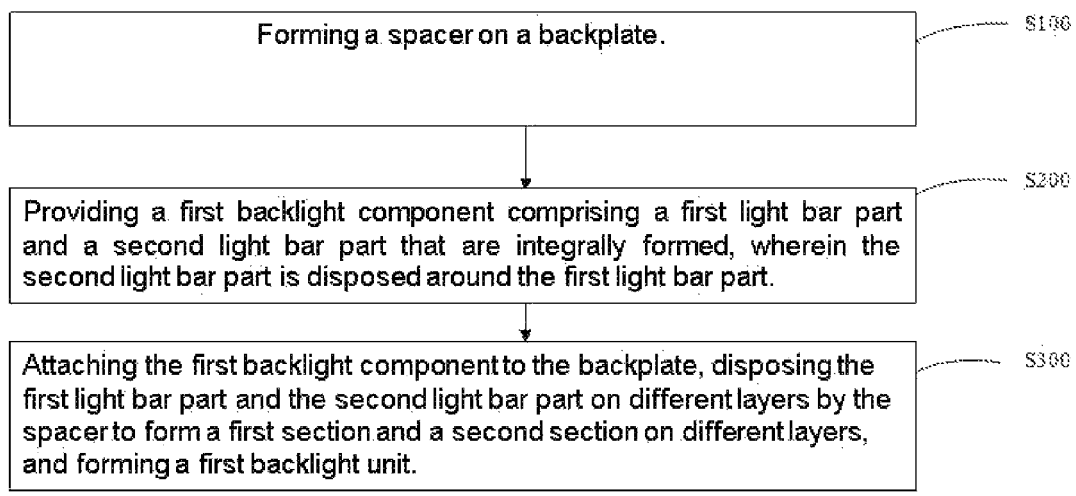
FIG. 10 is a flowchart of a manufacturing method of the display module according to an embodiment of the present disclosure.

Referring to FIG. 10, an embodiment of the present disclosure further provides a manufacturing method of the display module 100, which includes following steps.

S100: forming the spacer 440 on the backplate 480.

S200: providing a first backlight component 600 including the first light bar part 710 and the second light bar part 720 that are integrally formed, wherein, the second light bar part 720 is disposed around the first light bar part 710.

S300: attaching the first backlight component 600 to the backplate 480, disposing the first light bar part 710 and the second light bar part 720 on different layers by the spacer 440 to form the first section 410 and the second section 420 on different layers, and forming the first backlight unit 400.

The embodiment of the present disclosure has the first section and the second section that are integrally formed be on different layers by the spacer when bonding, thereby realizing time-sharing control and fill light effect. Therefore, the difficulty of the manufacturing process can be reduced, the cost can be reduced, and overall display effect can be improved.

Specific embodiments are used to describe technical solutions of the present disclosure.

In this embodiment, the manufacturing method of the display module 100 includes following steps.

Figure 11A:
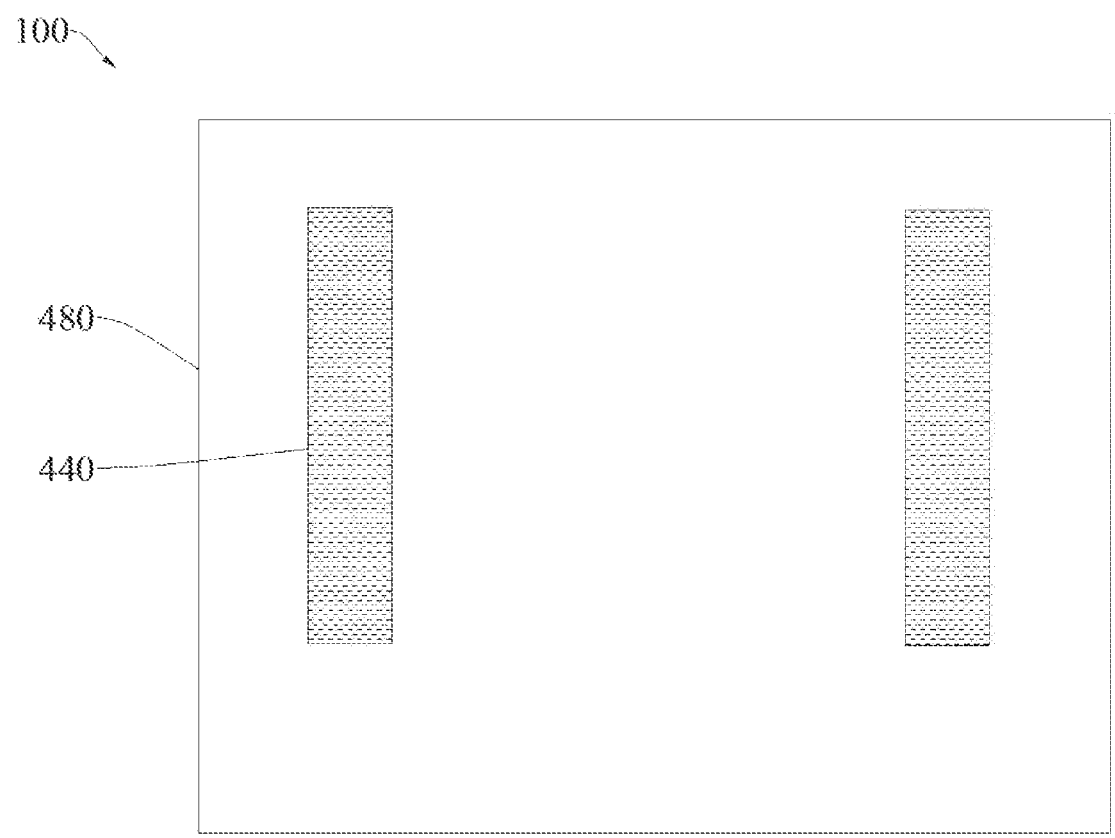
FIGS. 11A to 11C are schematic process diagrams of the manufacturing method of the display module according to an embodiment of the present disclosure.

S100: forming the spacer 440 on the backplate 480, which can refer to FIG. 11A.

In some embodiments, the material of the spacer 440 is silicone or resin. Therefore, using flexibility of silicone or resin materials can have a good buffering effect on the second section 420 while realizing the elevated effect, thereby protecting the first backlight unit 400 and extending a service life of the first backlight unit 400.

In some embodiments, the spacer 440 includes a telescopic unit, and a telescopic direction of the telescopic unit is perpendicular to the display panel 200.

The spacer 440 may have a changeable thickness, thereby adjusting an elevated distance between the first section 410 and the second section 420 or adjusting the included angle θ of the second section 420. Therefore, various scenarios of different process parameters or different optical requirements can be adapted, thereby improving adjustability and convenience of adjustment.

Figure 11B:
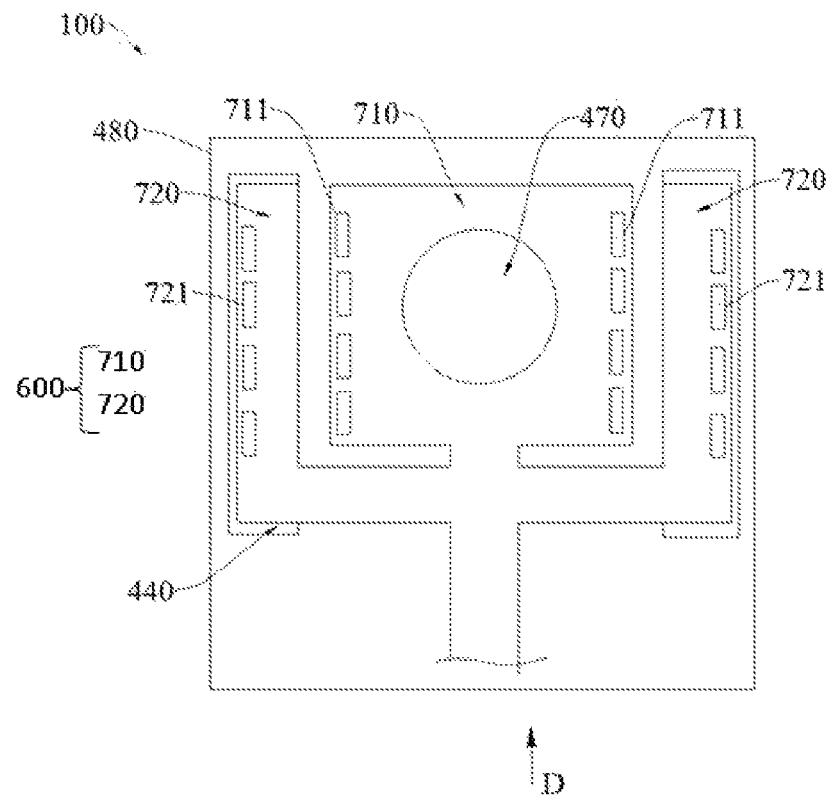

S200: providing the first backlight component 600 including the first light bar part 710 and the second light bar part 720 that are integrally formed, wherein, the second light bar part 720 is disposed around the first light bar part 710, which can refer to FIG. 11B.

In some embodiments, referring to FIG. 4, the first backlight unit 400 further includes the connecting section 450 and the third section 430. The first section 410 and the second section 420 are converged to the connecting section 450 to be integrally formed, and the connecting section 450 extends toward the third section 430.

In some embodiments, referring to FIG. 4, in the top view direction of the backlight module 300, the spacer 440 is disposed on both sides and away from the connecting section 450, and the spacer 440 and the second section 420 have an overlapping area.

Figure 11C:
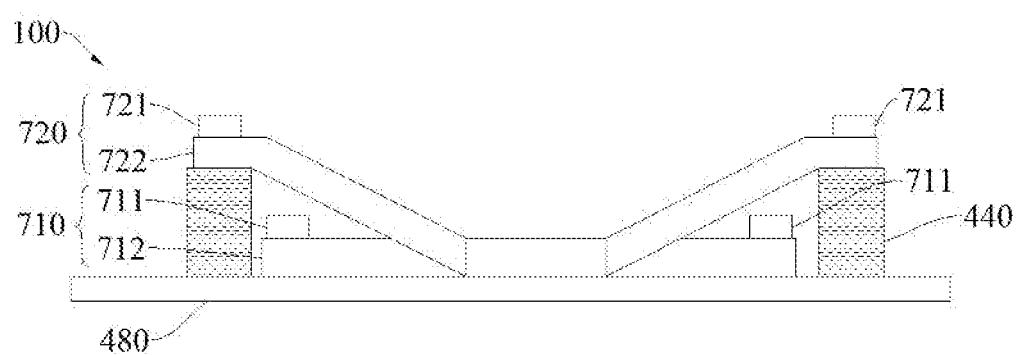

S300: attaching the first backlight component 600 to the backplate 480, disposing the first light bar part 710 and the second light bar part 720 on different layers by the spacer 440 to form the first section 410 and the second section 420 on different layers, and forming the first backlight unit 400, which can refer to FIG. 11C.

Referring to FIG. 9, FIG. 9(a) is the structure before elevating, and FIG. 9(b) is the structure after elevating. With the spacer 440, the first section 410 and the second section 420 that are integrally formed can be disposed on different layers at the spacer 440 when bonding, thereby forming the structure having the higher position and the lower position. Therefore, the time-sharing control and fill light effect can be realized, and the backlight structure of the under-screen functional display area B can be simplified, thereby realizing thinning of the backlight structure of the functional display area B, simplifying the assembly, reducing the difficulty of the manufacturing process, reducing the cost, and improving overall display effect.

With the connecting section 450, the first section 410 and the second section 420 can be connected together and integrally formed. When manufacturing the first backlight unit 400, the first section 410 and the second section 420 have been formed integrally with the connecting section 450. The first section 410 and the second section 420 are both flexible materials, such as printed circuit boards, and the first section 410 and the second section 420 can be disposed on different layers by using the raised spacer 440 to elevate the second section 420 when bonding.

In some embodiments, the step S300 includes following steps.

S310: attaching the first backlight component 600 to the backplate 480, and disposing the first light bar part 710 and the second light bar part 720 on different layers by the spacer 440.

In some embodiments, referring to FIGS. 5 and 7, the first section 410 includes the first light bar part 710, and the second section 420 includes the second light bar part 720. The first light bar part 710 includes the first light board 712 and the plurality of first light-emitting units 711 disposed on the periphery of the first light board 712. The second light bar part 720 includes the second light board 722 and the plurality of second light-emitting units 721 disposed on the periphery of the second light board 722.

S320: forming the first reflective sheet 731 on one side of the first light bar part 710 away from the display panel 200, and forming the first light guide plate 732 on one side of the first reflective sheet 731 adjacent to the display panel 200, which can refer to FIG. 5.

S330: forming the second reflective sheet 741 on one side of the second light bar part 720 away from the display panel 200, forming the second light guide plate 742 on one side of the second reflective sheet 741 adjacent to the display panel 200, and forming the brightness enhancement film 743 on one side of the second light guide plate 742 adjacent to the display panel 200, which can refer to FIG. 5.

In some embodiments, referring to FIG. 5, the first section 410 includes the first light-emitting units 711 disposed on the periphery of the first section 410, the first reflective sheet 731 on one side away from the display panel 200, and the first light guide plate 732 disposed on one side of the first reflective sheet 731 adjacent to the display panel 200. The second section 420 includes the second light-emitting units 721 disposed on the periphery of the second section 420, the second reflective sheet 741 on the side away from the display panel 200, the second light guide plate 742 disposed on one side of the second reflective sheet 741 adjacent to the display panel 200, and the brightness enhancement film 743 disposed on one side of the second light guide plate 742 adjacent to the display panel 200.

In some embodiments, the manufacturing method of the display module 100 further includes following steps.

S400: providing the display panel 200, which includes the functional display area B and the main display area A surrounding the functional display area B.

S500: providing the second backlight unit 500.

S600: attaching the second backlight unit 500 correspondingly to the main display area A of the display panel 200.

S700: attaching the first backlight unit 400 correspondingly to the functional display area B of the display panel 200.

S800: disposing the optical module 800 on one side of the first backlight unit 400 away from the display panel 200 in the functional display area B.

In some embodiments, the display module 100 further includes the optical module 800, the first section 410 includes the first opening 470, and in the top view direction of the display panel 200, the optical module 800 is disposed corresponding to the first opening 470. The optical module 800 may also be disposed in the first opening 470.

When the optical module 800 is working, the functional display area B is not displayed. When the optical module 800 is not working, the functional display area B is displayed, thereby achieving true full-screen display. The first opening 470 can improve the light-collecting efficiency of the optical module 800.

In some embodiments, the optical module 800 may be any one of a camera, an optical fingerprint sensor, an infrared sensor, or a distance sensor.

The embodiment of the present disclosure has the first section and the second section that are integrally formed be on different layers by the spacer when bonding, thereby realizing time-sharing control and fill light effect. Therefore, the difficulty of the manufacturing process can be reduced, the cost can be reduced, and overall display effect can be improved.

Figure 12:
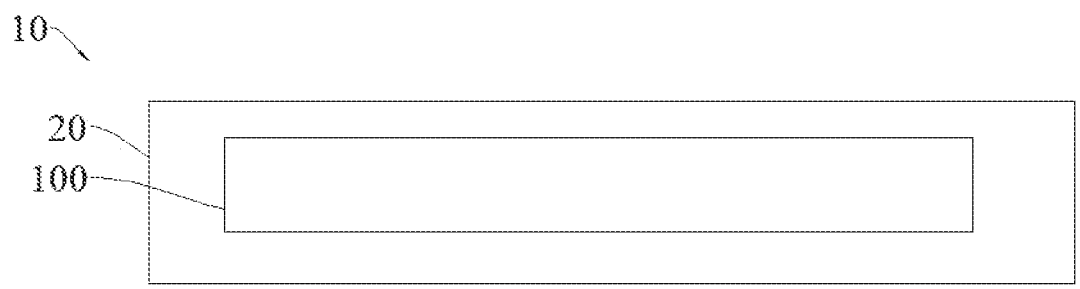
FIG. 12 is a schematic structural diagram of a mobile terminal according to an embodiment of the present disclosure.

Referring to FIG. 12, an embodiment of the present disclosure further provides a mobile terminal 10, which includes any one of the display module 100 mentioned above and a terminal body 20, wherein, the terminal body 20 and the display module 100 are combined into one integrated structure.

A specific structure of the display module 100 can refer to any one of the embodiments of the display module 100 and FIGS. 2 to 9, and will not be repeated herein.

In this embodiment, the terminal body 20 may include a middle frame, a sealant, etc., and the mobile terminal 10 may be a mobile display terminal, such as a mobile phone or a tablet, which is not limited herein.

The embodiments of the present disclosure provide the display module, the manufacturing method thereof, and the mobile terminal. The display module includes the functional display area and the main display area surrounding the functional display area, and includes the display panel and the backlight module. The backlight module includes the first backlight unit corresponding to the functional display area. The first backlight unit includes the first section and the second section disposed around the first section, and the first section and the second section are integrally formed and on different layers. The first backlight unit further includes the spacer disposed between the first section and the second section. The embodiment of the present disclosure has the first section and the second section that are integrally formed be on different layers by the spacer when bonding, thereby realizing time-sharing control and fill light effect. Therefore, the difficulty of the manufacturing process can be reduced, the cost can be reduced, and overall display effect can be improved.

It can be understood that for a person of ordinary skill in the art, equivalent replacements or changes can be made according to the technical solution of the present disclosure and its inventive concept, and all these changes or replacements should fall within the protection scope of the claims attached to the present disclosure.

What is claimed is:

1. A display module, having a functional display area and a main display area surrounding the functional display area and comprising:
   a display panel; and
   a backlight module disposed on one side of the display panel and comprising a first backlight unit corresponding to the functional display area, wherein the first backlight unit comprises a first section and a second section disposed around the first section, and the first section and the second section are integrally formed;
   wherein the first section and the second section are disposed on different layers, and the first backlight unit further comprises a spacer disposed between the first section and the second section.

2. The display module according to claim 1, wherein the first backlight unit further comprises a connecting section and a third section; and
   the first section and the second section are converged to the connecting section to be integrally formed, and the connecting section extends toward the third section.

3. The display module according to claim 2, wherein in a top view direction of the backlight module, the spacer is disposed on both sides and away from the connecting section, and the spacer and the second section have an overlapping area.

4. The display module according to claim 3, wherein the first section comprises a first light bar part, a first reflective sheet on one side away from the display panel, and a first light guide plate disposed on one side of the first reflective sheet adjacent to the display panel;
   the second section comprises a second light bar part, a second reflective sheet on the side away from the display panel, a second light guide plate disposed on one side of the second reflective sheet adjacent to the display panel, and a brightness enhancement film disposed on one side of the second light guide plate adjacent to the display panel; and
   the first light bar part comprises a first light board and a plurality of first light-emitting units disposed on a periphery of the first light board, the second light bar part comprises a second light board and a plurality of second light-emitting units disposed on a periphery of the second light board, the second reflective sheet corresponding to the spacer is in contact with the second light board, and the second reflective sheet not corresponding to the spacer is suspended on the second light board.

5. The display module according to claim 1, wherein the first backlight unit further comprises a bus section, the first section comprises a first wire section, and the second section comprises a second wire section; and
   the first wire section and the second wire section are converged to the bus section, and the bus section is on a same layer as the first wire section or the second wire section.

6. The display module according to claim 1, wherein the backlight module further comprises a second backlight unit corresponding to the main display area, and the second section is disposed between the first section and the second backlight unit.

7. The display module according to claim 6, wherein a part of the second section overlaps the second backlight unit.

8. The display module according to claim 6, wherein in a direction from a light-emitting side of the second section through one side away from the light-emitting side of the second section to the first section, an included angle between a plane where the first section is located and a plane where the second section is located is an acute angle.

9. The display module according to claim 1, further comprising an optical module;
   wherein the first section comprises a first opening, and the optical module is disposed corresponding to the first opening.

10. The display module according to claim 1, wherein a transparent layer is filled between the first backlight unit and the display panel.

11. A manufacturing method of a display module, comprising following steps:
forming a spacer on a backplate;
providing a first backlight component comprising a first light bar part and a second light bar part that are integrally formed, wherein the second light bar part is disposed around the first light bar part; and
attaching the first backlight component to the backplate, disposing the first light bar part and the second light bar part on different layers by the spacer to form a first section and a second section on different layers, and forming a first backlight unit.

12. A mobile terminal, comprising a display module and a terminal body, wherein the terminal body and the display module are combined into one integrated structure;
wherein the display module has a functional display area and a main display area surrounding the functional display area and comprises:
a display panel; and
a backlight module disposed on one side of the display panel and comprising a first backlight unit corresponding to the functional display area, wherein the first backlight unit comprises a first section and a second section disposed around the first section, and the first section and the second section are integrally formed;
wherein the first section and the second section are disposed on different layers, and the first backlight unit further comprises a spacer disposed between the first section and the second section.

13. The mobile terminal according to claim 12, wherein the first backlight unit further comprises a connecting section and a third section; and
the first section and the second section are converged to the connecting section to be integrally formed, and the connecting section extends toward the third section.

14. The mobile terminal according to claim 13, wherein in a top view direction of the backlight module, the spacer is disposed on both sides and away from the connecting section, and the spacer and the second section have an overlapping area.

15. The mobile terminal according to claim 14, wherein the first section comprises a first light bar part, a first reflective sheet on one side away from the display panel, and a first light guide plate disposed on one side of the first reflective sheet adjacent to the display panel;
the second section comprises a second light bar part, a second reflective sheet on the side away from the display panel, a second light guide plate disposed on one side of the second reflective sheet adjacent to the display panel, and a brightness enhancement film disposed on one side of the second light guide plate adjacent to the display panel; and
the first light bar part comprises a first light board and a plurality of first light-emitting units disposed on a periphery of the first light board, the second light bar part comprises a second light board and a plurality of second light-emitting units disposed on a periphery of the second light board, the second reflective sheet corresponding to the spacer is in contact with the second light board, and the second reflective sheet not corresponding to the spacer is suspended on the second light board.

16. The mobile terminal according to claim 12, wherein the first backlight unit further comprises a bus section, the first section comprises a first wire section, and the second section comprises a second wire section; and
the first wire section and the second wire section are converged to the bus section, and the bus section is on a same layer as the first wire section or the second wire section.

17. The mobile terminal according to claim 12, wherein the backlight module further comprises a second backlight unit corresponding to the main display area, and the second section is disposed between the first section and the second backlight unit.

18. The mobile terminal according to claim 17, wherein a part of the second section overlaps the second backlight unit.

19. The mobile terminal according to claim 17, wherein in a direction from a light-emitting side of the second section through one side away from the light-emitting side of the second section to the first section, an included angle between a plane where the first section is located and a plane where the second section is located is an acute angle.

20. The mobile terminal according to claim 12, wherein the display module further comprises an optical module; and
the first section comprises a first opening, and the optical module is disposed corresponding to the first opening.

* * * * *